United States Patent [19]

Masuda et al.

[11] Patent Number: 5,115,174
[45] Date of Patent: May 19, 1992

[54] METHOD OF CONTROLLING BRUSHLESS DC MOTOR

[75] Inventors: Hiroshi Masuda, Hiratuka; Katuhiro Tunata, Odawara, both of Japan

[73] Assignee: Hitachi, Ltd., Tokyo, Japan

[21] Appl. No.: 648,994

[22] Filed: Jan. 31, 1991

Related U.S. Application Data

[63] Continuation-in-part of Ser. No. 460,990, Jan. 4, 1990, Pat. No. 5,012,166.

[30] Foreign Application Priority Data

Jan. 31, 1990 [JP] Japan .................................. 2-21607

[51] Int. Cl.$^5$ .............................................. H02P 7/00
[52] U.S. Cl. ..................................... 318/254; 318/439
[58] Field of Search ................... 318/132, 254, 254 A, 318/439, 602, 635, 650, 139, 696, 718–723, 700, 704, 705, 716, 711, 712, 255; 388/803, 805, 813

[56] References Cited

U.S. PATENT DOCUMENTS

| | | | |
|---|---|---|---|
| 3,908,130 | 7/1975 | Lafuze | 318/254 X |
| 4,777,419 | 10/1988 | Obradovic | 318/254 X |
| 4,876,491 | 10/1989 | Squires et al. | 318/138 |
| 4,987,352 | 1/1991 | Ishii | 318/254 |
| 5,012,166 | 4/1991 | Ushijima et al. | 318/254 |

FOREIGN PATENT DOCUMENTS 63-69489 7/1988 Japan .

Primary Examiner—William M. Shoop, Jr.
Assistant Examiner—A. Jonathan Wysocki
Attorney, Agent, or Firm—Fay, Sharpe, Beall, Fagan, Minnich & McKee

[57] ABSTRACT

Control of a brushless DC motor which has a plurality of windings and a rotor with a plurality of magnetic poles, is accomplished by sucessively feeding the current for driving the rotor to the windings to rotate the motor. The voltage of a power source that supplies the current is measured, a threshold current level for detecting the position of the rotor relative to the winding is set based on the measured voltage, the current supplied to the winding is limited and permitted to flow again into the same winding while the rising condition of current is measured, the measured rising condition is compared with the threshold level to determine switching of the current to the next winding, and the control is repeated when it is determined that the current should not be switched to the next winding.

26 Claims, 6 Drawing Sheets

METHOD OF CONTROLLING BRUSHLESS DC MOTOR

This application is a continuation-in-part of application Ser. No. 07/460,990, filed Jan. 4, 1990, now U.S. Pat. No. 5,012,166, issued Apr. 30, 1991.

BACKGROUND OF THE INVENTION

The present invention relates to a method of controlling a brushless DC motor, and particularly to technology that can be effectively adapted to control the speed of a brushless DC motor without using any particular magnetic sensor for detecting the rotational position.

Owing to its maintenance-free and highly reliable performance, the brushless DC motor has been extensively used in a variety of fields, such as driving the rotary head of a video tape recorder (VTR) and driving the disk in a disk memory device. In the brushless DC motor, a drive current is fed successively into the windings wound on a plurality of magnetic pole pieces of the stator to generate a revolving magnetic field, and the rotor is rotated in synchronism with the revolving magnetic field. In the brushless DC motor, in general, the rotational position of the rotor must be detected to determine the timing of the commutation of the drive electric current, and a magnetic sensor such as a Hall element is added to the motor for this purpose.

In an attempt to decrease the size of the motor and to decrease the consumption of electric power in recent years, there has been proposed technology as disclosed in, for example, Japanese Patent Laid-Open No. 69489/1988, according to which an electronic component such as a magnetic sensor is not attached to the motor, but the rotational position of the rotor is detected by monitoring the drive current of the motor, thereby enabling the size of the motor to be decreased. The above publication discloses a method wherein a high-frequency current is supplied to a plurality of windings of the stator to form short current pulses, and a peak in the amplitude of this current is detected to detect the rotational position of the rotor relative to the stator, thereby to determine the timing of commutation.

SUMMARY OF THE INVENTION

The present inventors have found that the following problems take place in the abovementioned conventional technology. The peak of amplitude of a drive current flowing into each of the windings changes depending upon a change in the power source voltage. However, since the threshold level for detecting the peak remains constant, the position of the rotor cannot often be correctly detected if there is a change in the power source voltage. Moreover, the drive torque of the rotor is seriously affected by a change in the power source voltage disturbance, and the torque of the rotor becomes insufficient as the power source voltage drops, causing the speed of the rotor to deviate from a desired speed.

An object of the present invention, therefore, is to control a brushless DC motor speed without being affected by the change in the power source voltage to improve stability.

Another object of the present invention is to provide a magnetic disk drive device which stably rotates the magnetic disk drive to improve reliability of operation without being affected by the change in the power source voltage.

The present invention controls a brushless DC motor which comprises a rotor having permanent magnets arranged in the peripheral direction and a stator having a plurality of windings that are opposed to the rotor and that are independently excited when a drive current is fed thereto. The drive current is successively supplied (commutated) to the windings that are wound on a plurality of magnetic pole pieces of the stator to generate a revolving magnetic field, and the rotor is rotated in synchronism with the revolving magnetic field. When the rotor is rotating, the amount of drive current that flows into the winding per unit time changes depending on a positional relationship of the rotor and the stator. In order to detect the position of the rotor, the drive current supplied to a winding is temporarily limited or reduced for a predetermined short period of time. After this period has passed, the limited drive current is supplied again to the same winding. The amount of change in the drive current per unit time is measured at the beginning of flow of current after the reducing. The amount of change is dependent upon the positional relationship of the poles of the rotor and the magnetic poles of the stator. This invention detects the amount of change and compares it with a desired threshold level in order to determine the timing of commutation.

This controlling of the brushless DC motor has been disclosed in detail in U.S. Pat. No. 5,012,166 owned by the present assignee. When the drive current is supplied to the windings wound on the stator, the winding form opposes S poles or N poles. It is here presumed that a magnetic pole of the stator is an N pole, by way of example. Here, in the pole of the rotor opposed to the N magnetic pole of the stator, a time of, for example, 200 $\mu$s is required for the drive current that flows into the magnetic pole of the stator to rise from nearly 0 to a maximum current value. When the rotor has five poles contrary to the above example, the time of 30 $\mu$s is required. That is, the amount of drive current per unit time changes at the time of rise depending upon the relative positions of the magnetic poles of the rotor and the magnetic poles of the stator.

In this case, the rising time of drive current increases with an increase in the power source voltage, and a change in the drive current increases per unit time. Therefore, the amount of change in the drive current per unit time is compared with a set threshold level to detect the relative positions of the rotor and the stator. That is, a change in the power source voltage gives rise to the development of error in the detection of rotor position without the embodiment of the present invention.

In the present invention, the threshold level is varied depending upon the change in the power source voltage. This makes it possible to determine the rotational position of the rotor relative to the stator more correctly then when the threshold level is set constant irrespective of the change in the power source voltage. Therefore, the position of the rotor can be correctly detected even when the power source voltage undergoes a change.

When the drive current at the time of normal speed is limited to a predetermined desired value, the torque of the rotor becomes insufficient when the power source voltage is low and the speed of the rotor is deviated from a desired value, as caused by the voltage disturbance. According to the present invention, however, the drive current is suitably limited at the time of normal speed depending upon a change in the power source voltage. Therefore, the consumption of electric power can be decreased without impairing stability in controlling the rotation of the rotor.

BRIEF DESCRIPTION OF THE DRAWING

Further features, objects and advantages of the present invention will become more clear from the following detailed description of a preferred embodiment shown in the drawing, wherein.

DETAILED DESCRIPTION OF A PREFERRED EMBODIMENT

Figure 1:
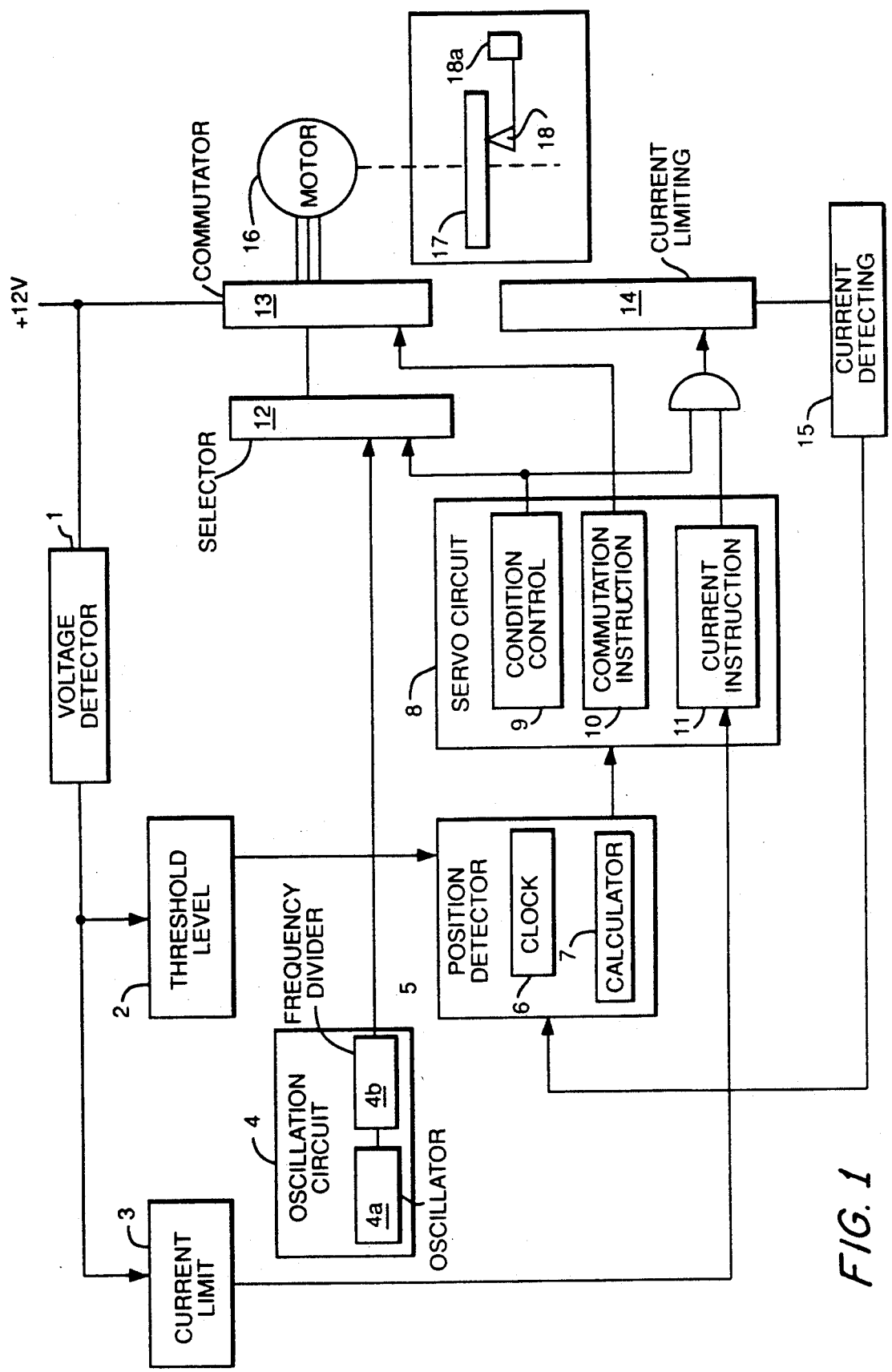
FIG. 1 is a block diagram of a circuit for controlling a brushless DC motor according to an embodiment of the present invention.

Described below in detail with reference to the drawing is an embodiment of the present invention in which controlling the brushless DC motor is employed, particularly for a magnetic disk drive device.

FIG. 1 is a block diagram of a circuit for controlling the brushless DC motor according to an embodiment of the present invention. A magnetic disk 17 is rotatably coupled to a motor 16 and rotates at a desired normal speed. A magnetic head 18 is arranged to be opposed to the recording surface of the magnetic disk 17 and to maintain a desired gap from the recording surface. The magnetic head 18 is driven by an actuator 18a and moves in the radial direction of the magnetic disk 17 to record/reproduce data onto/from predetermined areas of the magnetic disk.

Figure 2:
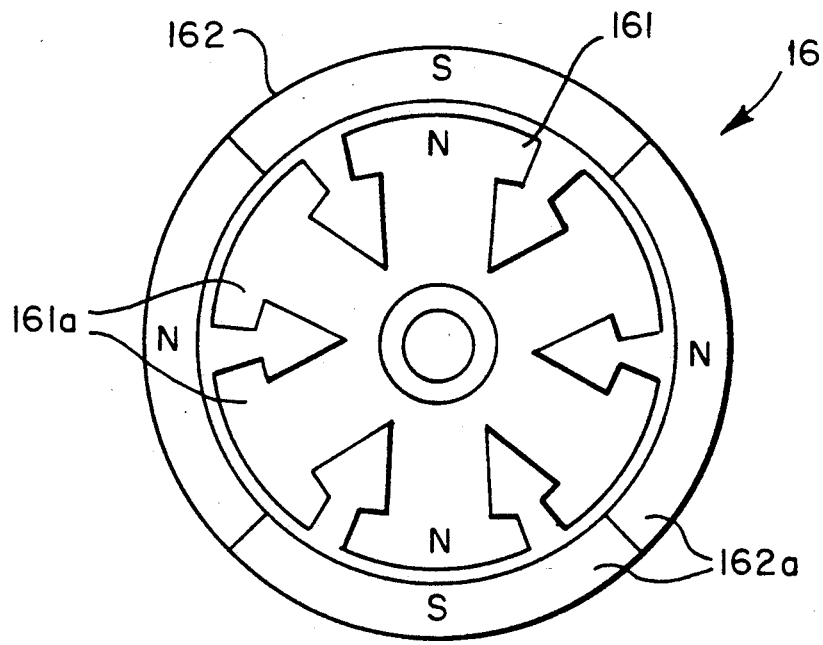
FIG. 2 is a diagram of a motor of the present invention.

Referring to FIG. 2, the motor 16 is constituted by a rotor 162 that includes magnetic poles 162a of dissimilar polarities, and a stator 161 arranged with poles 161a maintained at equal angles in the circumferential direction to corresponded to the magnetic poles 162a. In the case of this diagram, the stator 161 is of a so-called six-pole three-phase system in which the poles 161a opposed to each other are maintained at an angle of 180 degrees and become N poles simultaneously when an electric drive current is supplied to the corresponding winding of the two opposed poles 161a among the six poles 161a constituting the stator 161.

Figure 3:
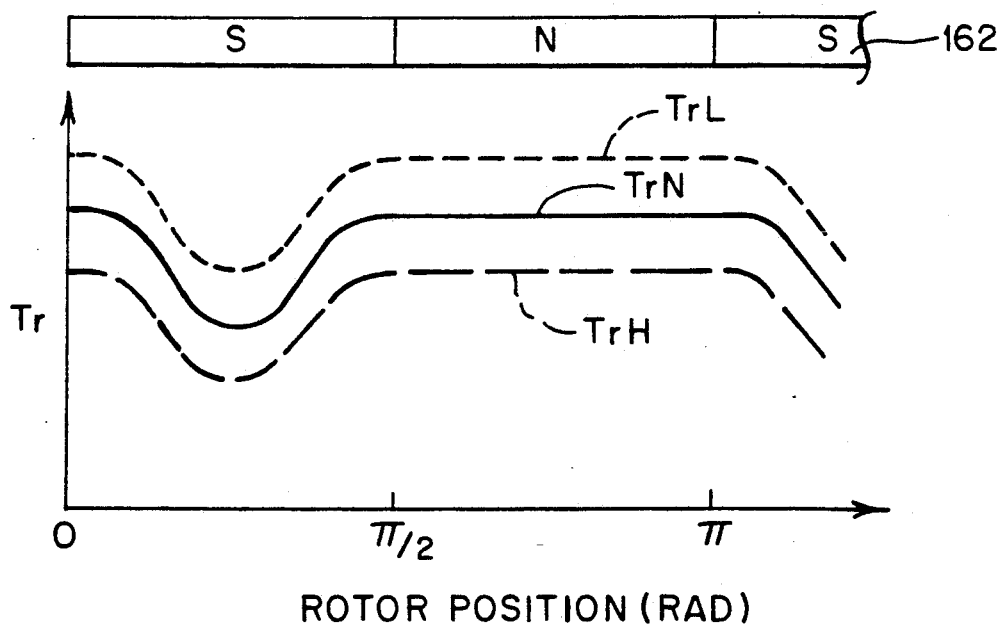
FIG. 3 is a diagram showing a change in the rising time of drive current caused by a change in the power source voltage.
Figure 4:
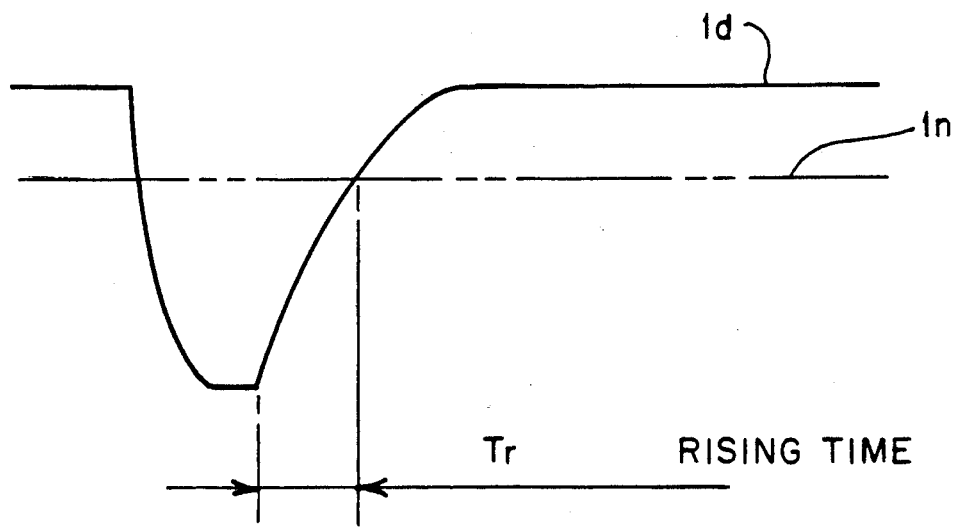
FIG. 4 is a diagram showing a waveform of drive current at the time of commutation.

FIGS. 3 and 4 show changes in the rising time Tr of drive current Id depending on the position of the magnetic pole 162a of the rotor 162 that corresponds to a phase of the stator 161 to which the drive current Id is supplied. The rising time Tr is the elapsed time in which the drive current Id flowing into each of the phases of the stator 161 reaches a predetermined current In from its lowest value. The rise time Tr becomes the smallest when the magnetic pole 162a is opposed to a pole 161a of the stator 161 that has a different polarity (S pole 162a opposed to N pole 161a in this case) and increases as the magnetic pole 162a separates away from the opposed position. Moreover, the rising time Tr varies depending upon the voltage of the power source 19 that supplies the drive current Id; i.e., the rising time Tr becomes shorter with an increase in the above voltage.

The structure for controlling the drive current Id supplied to the motor 16 will be described again with reference to FIG. 1. A commutation circuit 13 switches the drive current Id that is supplied to the stator 161 from a power source 19 of a nominal voltage of, for example, 12 volts. A current-limiting circuit 14 temporarily reduces, preferably to 0, the drive current Id that flows into the stator 161 in order to reduce the drive current Id sufficiently that the rising time of reestablishing the drive current Id can be used to detect the rotor position. A current detecting circuit 15 measures the amount of change, when the drive current Id increases after being reduced temporarily.

Oscillation circuit 4 includes an oscillator 4a and a frequency divider 4b, and provides a timing instruction signal to be used by the signal select circuit 12 to control commutation at the time of normal speed.

A position detector 5 includes a clock circuit 6 and a calculation circuit 7. The position detector provides the timer signal 5a and measuring instruction signal 5b of FIG. 5, and detects the rotational position of the rotor 162 based on the data representative of the rising time, from the current detecting circuit 15. The detected rotational position of the rotor is fed from position detector 5 to a servo circuit 8. The servo circuit includes a condition control circuit 9 that determines whether the speed of the rotor 162 is under the normal speed condition or not, a commutation instruction circuit 10 that controls the commutation circuit 13 based upon the instruction from the position detector 5, and a drive current instruction circuit 11 that provides the limit value of magnitude of the drive current for normal speed.

The signal select circuit 12 is provided between the oscillation circuit 4 and the commutation circuit 13. Depending upon the data obtained from the condition control circuit 9, the signal select circuit 12 determines whether the commutation instruction from the oscillation circuit 4 is to be transmitted to the commutation circuit 13 or not.

Voltage detecting circuit 1 detects the voltage of the power source and outputs a signal that corresponds to the magnitude of the voltage, which is fed to the position detect level determining circuit 2 and the normal current determining circuit 3. The position detect level determining circuit 2 sets a threshold level that is used for determining the timing of commutation in the calculation circuit 7 of the position detector 5. The position detect level determining circuit 2 sets and outputs one of three position detect specifying reference levels ThN, ThH and ThL depending, for example, upon whether the voltage of the power source is equal to, higher than, or lower than, the specified voltage value, respectively, and outputs the selected one to the drive current instruction circuit 11 in the servo circuit 8 as the threshold level Th. The normal current determining circuit 3 sets and outputs one of three current limit reference values IpN, IpH and IpL, depending, for example, upon whether the voltage of the power source is equal to, higher than, or lower than, the specified voltage value, respectively, and outputs the selected one to the drive current instruction circuit 11 in the servo circuit 8 as a current limit value Ip.

Figure 5:
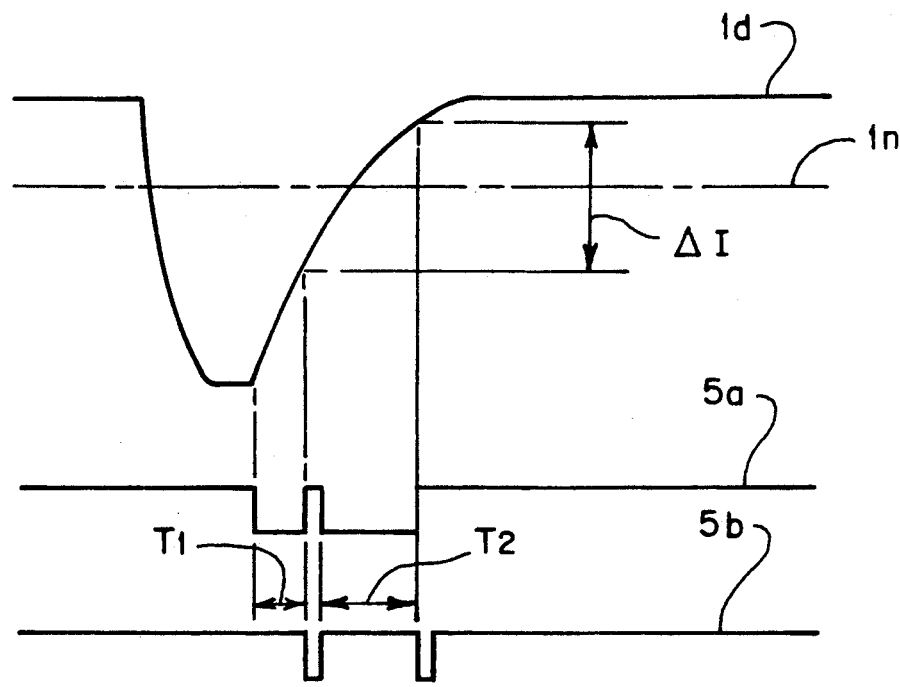
FIG. 5 is a diagram for explaining the method of measuring the difference in the drive current at the rise of drive current.

Operations of these portions will now be described. At the time of starting the motor, first, the voltage detecting circuit 1 measures the voltage of the power source and sends the measured result to the position detect level determining circuit 2 and to the normal current determining circuit 3. Based on the magnitude of the voltage of the power source that is measured, the position detect level determining circuit 2 selects one of the position detect specifying reference levels ThN, ThH or ThL, and sends the selected one to the calculation circuit 7 in the position detector 5 as a threshold level Th. The calculation circuit 7 compares the threshold level Th that is most adapted to the voltage value of the power source with a difference ΔI between two values of the drive current Id that were respectively measured as shown in FIG. 5, in order to detect the position of the rotor 162.

On the other hand, the normal current determining circuit 3 selects one of the current limit values IpN, IpH, or IpL as the most suited to the voltage that is measured by the voltage detecting circuit 1, and sets this selected one limiting value, to the drive current instruction circuit 11 as the current limit value Ip. After the normal motor speed is reached, the drive current instruction circuit 11 instructs the current limiting circuit 14 that the upper limit of the drive current Id is set to become equal to the current limit value Ip that is most suited to the present power source voltage. The drive current Id supplied from the power source to the stator 161 of the motor 16 is measured by the current detecting circuit 15 and an output signal correlated to the measured drive current Id is sent to the position detector 5. The calculation circuit 7 in the position detector 5 calculates the current-feeding time, and determines whether the rotor 162 is at such a rotational position where the communtation should be effected or not based upon the threshold level Th. When the rotational position is just at the commutation timing, an instruction is sent to the commutation circuit 13 via the commutation instruction circuit 10 and the phase of excitation is advanced by one in the stator 161 of the motor 16 by switching drive current Id to the next winding of the stator.

Here, the current-feeding time calculated by the calculation circuit 7 is the time in which one phase is being excited, and is, for example, 80% of the sum of the time in which the current was fed to a given phase and the time in which was detected the commutation timing for feeding current to the next phase. The current-feeding time is measured by the clock circuit 6 of the position detector 5. After the current-feeding time has passed, the drive current Id is measured by the current detecting circuit 15 to carry out again the above-mentioned position detecting operation.

As the rotor 162 of the motor 16 reaches a desired normal speed, the condition control circuit 9 that has detected this normal condition sends an instruction to the signal select circuit 12. The signal select circuit 12, in response to the instruction from the condition control circuit 9, sends a timing instruction of commutation to the commutation circuit 13 from the oscillation circuit 4 to be used by the commutation circuit 13 instead of the timing instruction from the commutation instruction circuit 10. At the same time, the condition control circuit 9 sends its output instruction to an AND gate that will thereby output to the current limiting circuit 14 the selected current limit value Ip that has been set to the drive current instruction circuit 11 and that is most suited to the present voltage of the power source. Therefore, the current limiting circuit 14 controls the upper limit of the drive current Id to become equal to the selected current limit value Ip only when normal speed is obtained.

FIG. 5 is a diagram illustrating how to evaluate the rise of drive current Id in the calculation circuit 7 of the position detector 5.

In the case of this embodiment, the drive current Id is measured at two points, i.e., at the trailing edge of timing T1 and the trailing edge of timing T2 of timer signal 5a in response to a measurement instruction signal 5b. The timer signal and the measurement instruction signal generated by the position detector 5. The rising time Tr is evaluated based upon the difference ΔI between these two measured points.

Figure 6:
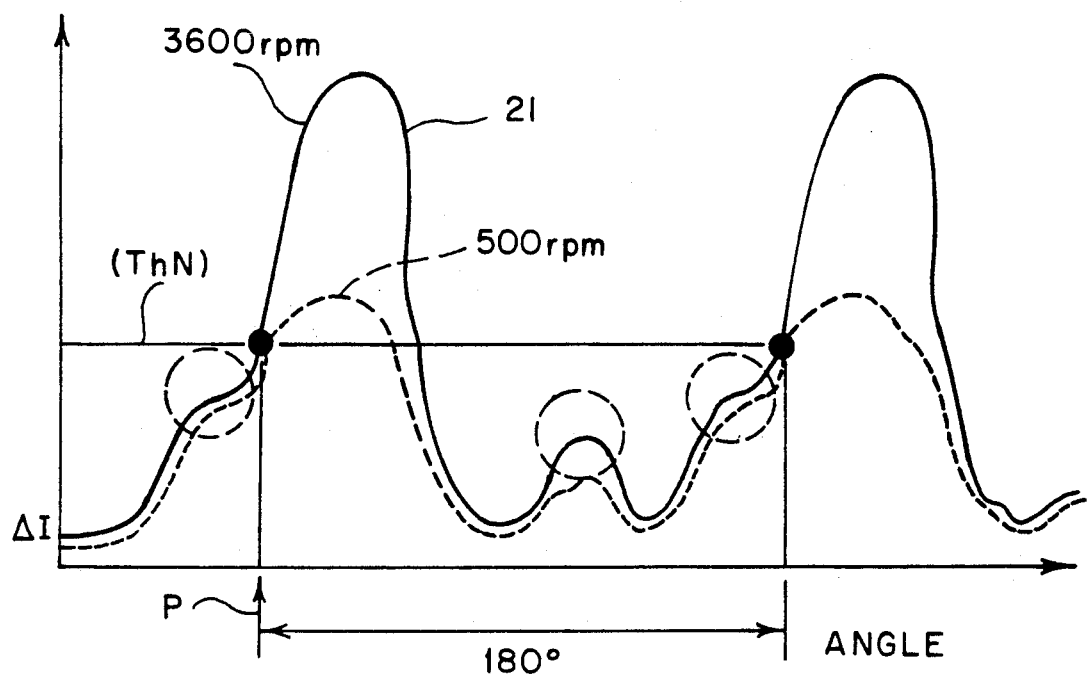
FIG. 6 is a diagram showing a relationship between the difference in the drive current and the rotational position of the rotor.

FIG. 6 shows a relationship between the difference ΔI of when the drive current Id is supplied to any one phase and the rotational position of the rotor 162. As shown in FIG. 6, the peak value of ΔI increases with an increase in the speed of the rotor 162. The timing of commutation for acceleration of the motor should be about 30 degrees before the point at which dissimilar poles of the rotor 162 and the stator 161 are opposed to each other. This commutation point P is determined by when the difference ΔI has exceeded the threshold level Th.

Figure 7:
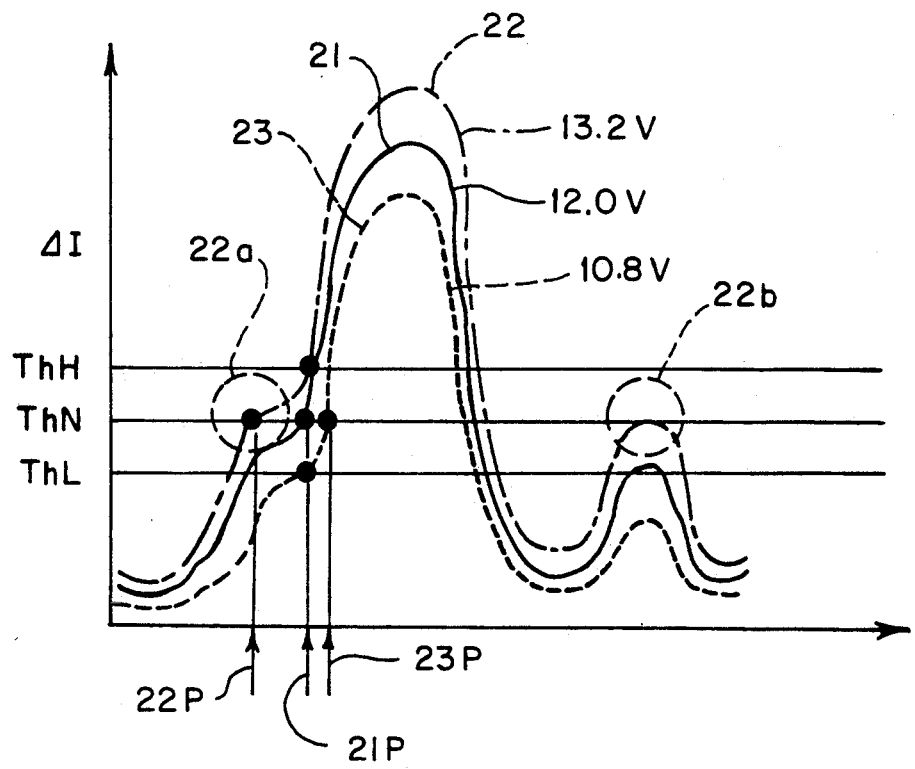
FIG. 7 is a diagram showing relationships between the difference in the drive current and the rotational positions of the rotor under various power source voltage conditions.

FIG. 7 shows relationships between the rotational position of the rotor 162 and the difference ΔI for the cases when the voltage of the power source has a nominal value of 12.0 V (curve 21), has a value of 13.2 V (curve 22), which is higher than the nominal value, and has a value of 10.8 V (curve 23), which is lower than the nominal value. When the voltage is 13.2 V, the rising time Tr becomes so short that curve 22 as a whole is upwardly shifted compared with curve 21 for the case of a nominal voltage of 12.0 V. When the voltage is 10.8 V, on the other hand, curve 23 is downwardly shifted relative to the nominal curve 21.

When the fixed position detect specifying level ThN which corresponds to the nominal value of 12.0 V is used as the threshold level Th as is done in the conventional technology, a region 22a of the curve 22 exceeds the position detect specifying level ThN, and the rotational position 22P of the rotor 162 is detected earlier than the rotational position 21P when the voltage is 12.0 V, making it difficult to properly control the commutation. For the curve 22 of when the voltage is 13.2 V, furthermore, a region 22b of a relatively low peak developing among the highest peaks reaches the position detect specifying level ThN and the detection becomes completely erroneous. When the commutation is effected based on this erroneous detection, therefore, the speed is deviated from the desired value. Similarly, when the voltage is 10.8 V which is lower than the nominal voltage of 12.0 V, the rotational position of the rotor 162 is detected at a position 23P deviated backwards from the desired position.

In the case of this embodiment, therefore, when the actual voltage of the power source 19 measured via the voltage detecting circuit 1 is greater than the nominal value of 12.0 V, the position detect level determining circuit 2 sets a position detect specifying level ThH, which is higher than the level ThN, as the threshold level Th. When the power source voltage is smaller than the nominal voltage of 12.0 V, on the other hand, the position detect level determining circuit 2 sets a smaller position detect specifying level ThL to the calculation circuit 7 of the position detector 5. Thus, the undesirable positions 22P and 23P of the rotor 162 are avoided from being erroneously detected, and the commutation is properly effected based only upon the most desirable position 21P for all curves 21, 22, 23 of FIG. 7. Thus, it is possible to stably control the speed of the motor 16 from the start continuously to normal speed without being affected by a change in the voltage of the power source.

Figure 8A:
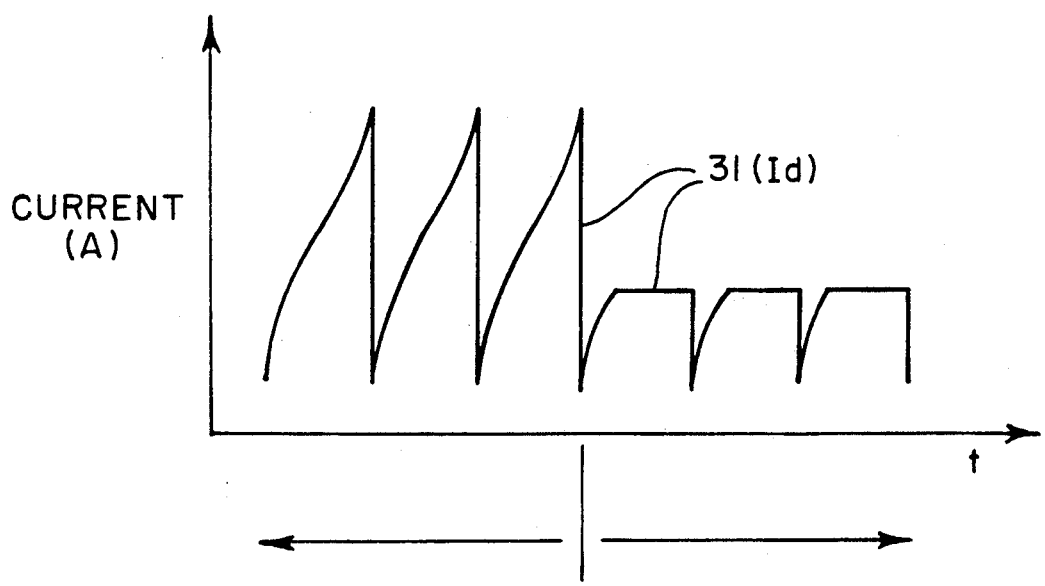
FIGS. 8A to 8C are diagrams showing waveforms of the drive current when the current is limited.

Next, described below is how to control the speed of the rotor 162 after the normal speed is reached. When the rotor 162 is rotating at a constant speed, not so large a torque is required to maintain the speed. From the standpoint of decreasing the consumption of electric power, therefore, the drive current Id is limited to suppress a maximum value of the drive current Id. FIG. 8A shows waveforms of the drive current Id before and after the current is limited.

Figure 8B:
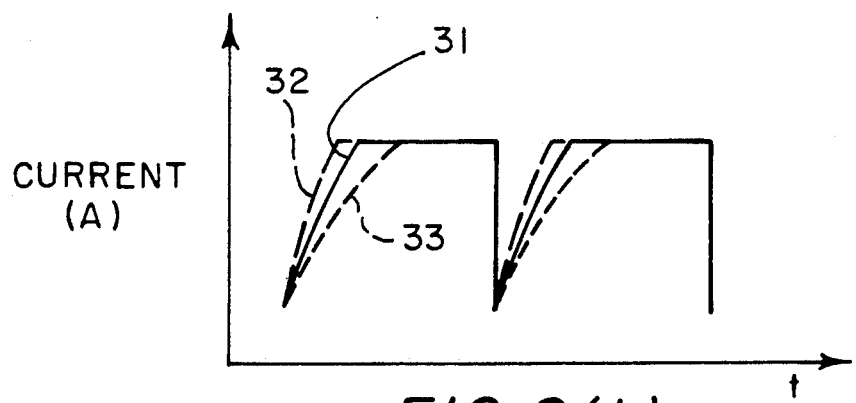

When the voltage of the power source drops below nominal, rise of the drive current Id tends to be delayed as shown with waveform 33 in FIG. 8B as compared to the waveform 31 that corresponds to nominal voltage of the power source; also, the torque becomes smaller than the torque obtained with the nominal value of 12.0 V. Therefore, the normal speed tends to be easily affected by external conditions that affect the power source voltage, developing such undesired phenomena as vibration in speed and a change from normal speed. When the voltage is high, on the other hand, the waveform 32 is advanced as compared with the nominal waveform 31; also, the torque becomes greater that the torque obtained with the nominal value of 12.0 V and there develops room for decreasing the consumption of electric power.

Figure 8C:
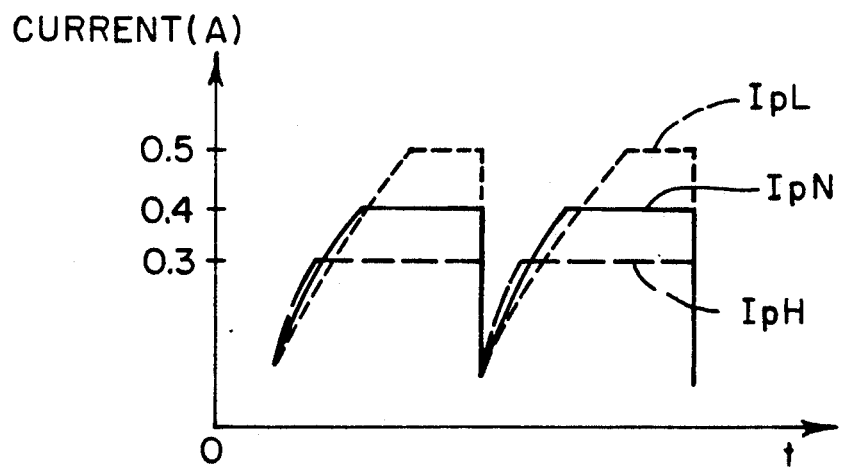

In the case of this embodiment as described earlier, the normal current determining circuit 3 adjusts the current limit value Ip depending upon the magnitude of voltage of the power source measured by the voltage detecting circuit 1, i.e., adjusts the current limit value Ip to be 0.4 A (IpN) when the voltage is 12.0 V, to be 0.5 A (IpH) when the voltage is higher than the above value, and to be 0.3 A (IpL) when the voltage is lower than the above value as shown in FIG. 8C, and gives the current limit value Ip to the drive current instruction circuit 11 as shown with waveform 31(Id) in FIG. 8(a).

Under the normal speed condition, therefore, the current limit value Ip can be set to be not too great or not too small, but to be a proper value irrespective of the change in the power source voltage. Therefore, the motor 16 is stably speed-controlled, and the consumption of electric power can be decreased.

Figure 9:
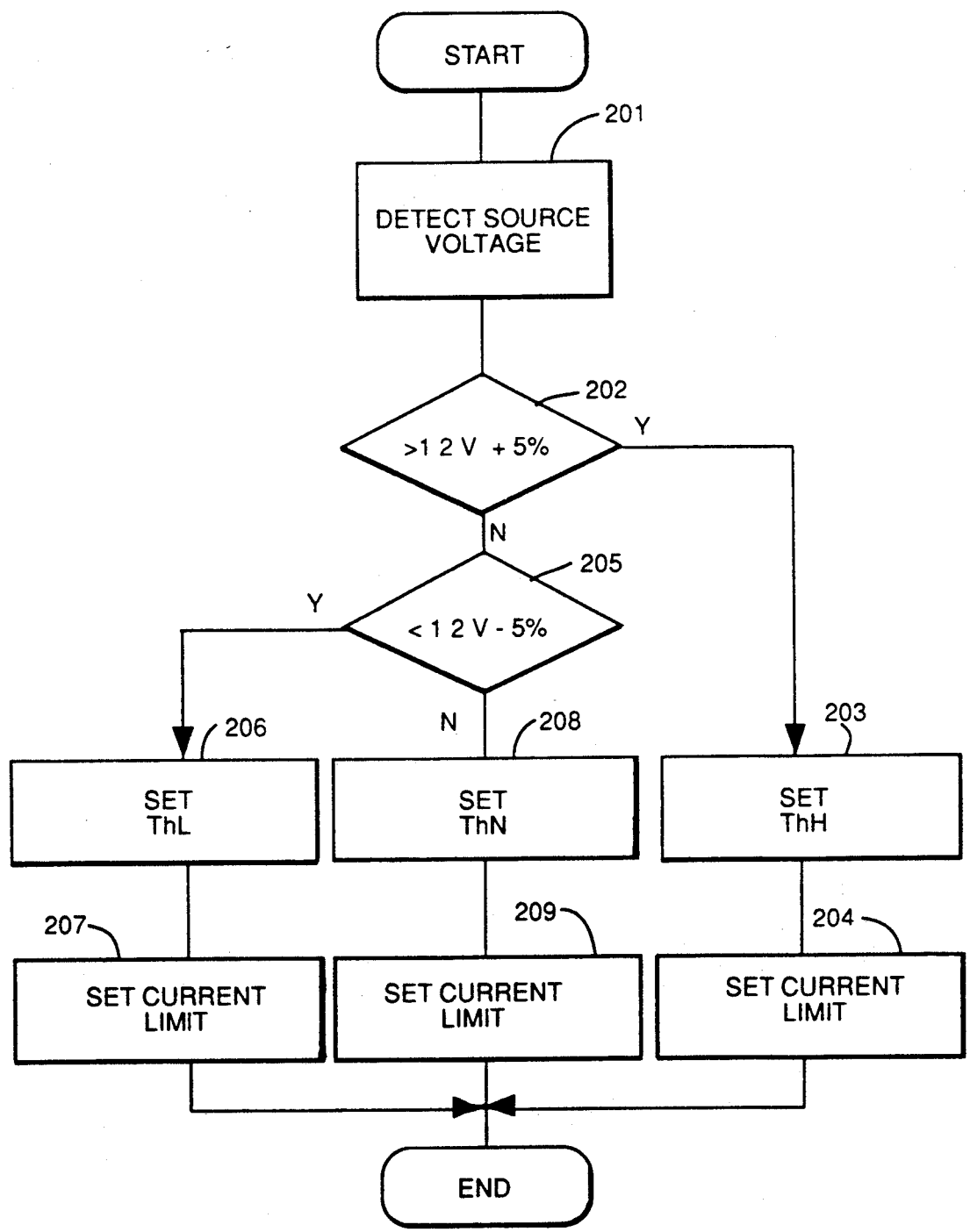
FIG. 9 is a flow chart illustrating a method of controlling the brushless DC motor according to an embodiment of the present invention.

FIG. 9 is a flow chart for explaining the abovementioned series of control operations. First, the voltage of the power source is detected (step 201). It is then determined if the detected voltage is greater than the nominal value of 12.0 V+5% (step 202). When the power source voltage is greater than 12.0 V+5%, a position detect specifying level ThH that is greater than ThN is set (step 203) as the threshold level Th that serves as a reference for detecting the position of the rotor 162, and 0.3 A (IpL) is set as the current limit value Ip for use at the time of normal speed (step 204).

When the power source voltage is not greater than 12.0 V+5%, it is examined whether the power source voltage is smaller than 12.0 V−5% (step 205). When the power source voltage is smaller than 12.0 V−5%, the position detect specifying level ThL, which is smaller than the case of the nominal position detect specifying level ThN is set as the threshold level Th, and 0.5 A (IpH), which is greater than 0.4 A (IpN) of the case where voltage is the nominal value, is set as the current limit value Ip (step 207).

In other cases, i.e., when the power source voltage is within the nominal value of 12.0 V+/−5%, the position detect specifying level ThN is set as the threshold level Th (step 208), and 0.4 A (IpN) is set as the current limit value Ip (step 209).

In the foregoing was concretely described the invention accomplished by the present inventors by way of the disclosed embodiment. The present invention, however, is in no way limited to the aforementioned embodiment only but can be modified in a variety of ways without departing from the gist of the invention.

For instance, the position detect specifying level that serves as a reference or threshold level for detecting the rotational position of the rotor and the current limit value need not be limited to the three steps exemplified in the aforementioned embodiment, but may be set to a selection from among a further increased number of values. A function may be set with the power source voltage as an input, and the above threshold level Th and current limiting value Ip may be varied in compliance with this function.

In the above embodiment, furthermore, though the brushless DC motor was used for the magnetic disk device, the invention encompasses other devices that have a member that is to be rotated.

What is claimed is:

1. A method of controlling a brushless DC motor from the start of rotation until a normal speed is obtained, the motor having a plurality of windings and a rotor with a plurality of magnetic poles, and in which the current for driving the rotor is successively applied to the windings for each of successive predetermined periods of time in order to rotate the rotor, comprising the steps of:

feeding an electric current from a power source to at least a first winding among the plurality of windings for a first period of time;

monitoring the voltage of the power source during said feeding;

setting a threshold level in accordance with said voltage monitoring;

reducing the electric current fed to the first winding and thereafter increasing the reduced electric current to flow into the first winding, and simultaneously measuring a rising condition of the increasing current during the first period of time;

comparing the rising condition that is measured with the threshold level;

determining whether the electric current fed to the first winding during the first period of time is to be commutatingly switched to a second winding for a second period of time in accordance with the result of the comparing step;

commutatingly switching said feeding of the electric current to the second winding at the end of the first period of time in accordance with a determination, from said step of determining, that the electric current fed to the first winding is to be commutatingly switched; and repeating said steps of feeding, monitoring, reducing, increasing, measuring, comparing, determining, repeating, and switching with respect to the second winding for a second period of time when said determination to commutatingly switch has been made.

2. A method of controlling the brushless DC motor according to claim 1, including repeating said steps of feeding, monitoring, reducing, increasing, measuring, comparing and determining for the first winding responsive to a determination, from said step of determining, that the electric current fed to the winding is not to be commutatingly switched.

3. A method of controlling the brushless DC motor according to claim 1, wherein said step of feeding feeds the electric current as the entire driving current for the motor to generate a rotating magnetic field.

4. A method of controlling the brushless DC motor according to claim 1, wherein said step of setting includes setting three different reference levels, and selects one of the reference levels as the threshold level in accordance with said monitoring step.

5. A method of controlling the brushless DC motor according to claim 1, wherein said reducing step reduces the electric current to substantially a value of zero, and said measuring step measures the rising condition as the electric current rises from the value of substantially zero.

6. A method of controlling the brushless DC motor according to claim 1, wherein the rising condition measurement step includes measuring the rising condition as a difference in two electric current values in an interval of time.

7. A method of controlling the brushless DC motor according to claim 6, wherein said rising condition measurement step includes generating a timer signal for determining the interval of time.

8. A method of controlling the brushless DC motor according to claim 7, wherein said step of increasing is synchronized with the timer signal.

9. A method of controlling the brushless DC motor according to claim 1, wherein the plurality of windings are on the motor stator.

10. A method of controlling the brushless DC motor according to claim 2,
wherein said step of feeding feeds the electric current as the entire driving current for the motor to generate a rotating magnetic field.

11. A method of controlling the brushless DC motor according to claim 2, wherein said rising-condition measurement step includes measuring the rising condition as the difference in two electric current values in an interval of time.

12. A method of controlling the brushless DC motor according to claim 10, wherein the rising-condition measurement step includes measuring the rising condition as the difference in two electric current values in an interval of time.

13. A method of controlling the brushless DC motor according to claim 1, further comprising the step of:
controlling the brushless DC motor when the normal speed is reached by setting an upper limit value of the electric current in accordance with said step of monitoring the voltage of the power source, and limiting the electric current fed during said step of feeding when the electric current has reached the upper limit value.

14. A method of controlling the brushless DC motor according to claim 13, wherein said step of setting the upper limit value includes setting at least three predetermined values, and selecting one of three predetermined values as the upper limit value depending upon the magnitude of the measured voltage.

15. A method of controlling a brushless DC motor when the normal speed is reached, the motor having a plurality of windings and a rotor with a plurality of magnetic poles, and in which the current for driving the rotor is successively applied to the windings for each of successive predetermined periods of time in order to rotate the rotor, comprising the steps of:
feeding a drive electric current from a power source to one winding among the plurality of windings to generate a magnetic field for a first period of time in order to rotate the rotor;
measuring the voltage of the power source during said step of feeding;
setting an upper limit value of the electric current in accordance with said measuring the voltage; and
limiting the electric current fed with said step of feeding when the electric current has reached the upper limit value.

16. A method of controlling the brushless DC motor according to claim 15, wherein said step of setting the upper limit value forms at least three predetermined values, and selects one of them as the upper limit value depending upon the magnitude of the measured voltage.

17. A system for controlling a brushless DC motor of the type having a plurality of windings and a rotor with a plurality of magnetic poles, wherein current for driving the rotor is successively applied to the windings for each of successive predetermined periods of time in order to rotate the rotor, comprising:
a power source;
means for feeding an electric current from the power source to at least a first winding among the plurality of windings for a first period of time;
means for monitoring the voltage of the power source;
means for setting a threshold level in accordance with said monitored voltage;
means for controlling the electric current fed to the first winding, including means for reducing the electric current and thereafter increasing the reduced electric current while simultaneously measuring a rising condition of the increasing current during the first period of time;
means for comparing the rising condition with the threshold level;
means for determining whether the electric current fed to the first winding during the first period of time is to be commutatingly switched to a second winding for a second period of time in accordance with the comparison made by said means for comparing;
commutator means for commutatingly switching said feeding of the electric current to the second winding at the end of the first period of time in accordance with a determination, made by said means for determining, that the electric current is to be commutatingly switched; and
means for causing said feeding means, said monitoring means, said threshold level setting means, said electric current controlling means, said comparing means, and said determining means to repeat their respective functions with respect to the first winding when a determination to commutatingly switch has been made.

18. A system for controlling a brushless DC motor as claimed in claim 17, wherein said means for commutatingly switching said feeding of the electric current includes means for causing said feeding means, said monitoring means, said threshold level setting means, said electric current controlling means, said comparing means, and said determining means to repeat their respective functions with respect to a second winding when a determination not to commutatingly switch has been made.

19. A system for controlling a brushless DC motor as claimed in claim 17, wherein said means for commutatingly switching said feeding of the electric current includes means for instructing said feeding means, said monitoring means, said threshold level setting means, said electric current controlling means, said comparing means, and said determining means to repeat their respective functions with respect to the first winding responsive to a determination, made by said means for determining, that the electric current fed to the first winding is not to be commutatingly switched.

20. A system for controlling a brushless DC motor as claimed in claim 17, wherein said means for setting includes means for setting three different reference levels, and for selecting one of the reference levels as the threshold level.

21. A method for controlling a brushless DC motor as claimed in claim 17, wherein said means for controlling includes means for reducing the electric current to substantially a value of zero, and means for measuring the rising condition as the electric current rises from the value of substantially zero.

22. A system for controlling a brushless DC motor as claimed in claim 17, wherein the means for controlling the electric current includes means for measuring the rising condition as a difference in two electric current values in an interval of time.

23. A system for controlling a brushless DC motor as claimed in claim 22, further comprising means for generating a timer signal for determining the interval of time.

24. A method for controlling a brushless DC motor as claimed in claim 17, further comprising a stator on which said plurality of windings are wound.

25. A system for controlling a brushless DC motor as claimed in claim 17, further comprising:
means for controlling the motor when a normal speed is reached by setting an upper limit value of the electric current in accordance with said monitored voltage, and by limiting the electric current fed by said means for feeding when the electric current has reached the upper limit value.

26. A system for controlling a brushless DC motor as claimed in claim 25, wherein said means for setting the upper limit value includes setting at least three predetermined values, and selecting one of the three predetermined values as the upper limit value based on the monitored voltage.

* * * * *